(12) United States Patent
Johansson et al.

(10) Patent No.: US 11,595,813 B2
(45) Date of Patent: Feb. 28, 2023

(54) PROFILE HANDLING OF A COMMUNICATIONS DEVICE

(71) Applicant: Telefonaktiebolaget LM Ericsson (publ), Stockholm (SE)

(72) Inventors: Petri Mikael Johansson, Bjärred (SE); Per Ståhl, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 16/960,915

(22) PCT Filed: Jan. 29, 2018

(86) PCT No.: PCT/EP2018/052140
§ 371 (c)(1),
(2) Date: Jul. 9, 2020

(87) PCT Pub. No.: WO2019/137630
PCT Pub. Date: Jul. 18, 2019

(65) Prior Publication Data
US 2020/0351656 A1 Nov. 5, 2020

Related U.S. Application Data

(60) Provisional application No. 62/617,351, filed on Jan. 15, 2018.

(51) Int. Cl.
*H04W 12/02* (2009.01)
*H04W 4/60* (2018.01)
(Continued)

(52) U.S. Cl.
CPC ............ *H04W 12/02* (2013.01); *H04W 4/50* (2018.02); *H04W 4/60* (2018.02); *H04W 4/70* (2018.02);
(Continued)

(58) Field of Classification Search
None
See application file for complete search history.

(56) References Cited

U.S. PATENT DOCUMENTS

2017/0064552 A1  3/2017 Park et al.

FOREIGN PATENT DOCUMENTS

| CN | 106851621 A | 6/2017 |
|---|---|---|
| CN | 107580790 A | 1/2018 |

(Continued)

OTHER PUBLICATIONS

SGP.22_v1.1_RSP_Technical_Specification_v1.1_Jun. 9, 2016 (Year: 2016).*

(Continued)

*Primary Examiner* — Jinsong Hu
*Assistant Examiner* — Alexander J Yi
(74) *Attorney, Agent, or Firm* — Sage Patent Group

(57) ABSTRACT

There is presented mechanisms for profile handling of a communications device (300). A method is performed by a local profile assistant (200a) of a proxy device (200). The method comprises obtaining an indication of handling a profile of the communications device (300). The method comprises establishing a first secure communications link with a local profile assistant of the communications device. The method comprises establishing a second secure communications link with a subscription management entity (430) of the communications device. The method comprises receiving information pertaining to handling of the profile by the local profile assistant of the communications device, the information being received from the subscription management entity over the second secure communications link. The method comprises providing the information to the local profile assistant of the communications device over the first secure communications link.

8 Claims, 9 Drawing Sheets

(51) Int. Cl.
  *H04W 4/70*   (2018.01)
  *H04W 4/50*   (2018.01)
  *H04W 8/18*   (2009.01)
  *H04W 8/20*   (2009.01)
  *H04W 12/30*  (2021.01)
(52) U.S. Cl.
  CPC ........... *H04W 8/183* (2013.01); *H04W 8/205* (2013.01); *H04W 12/35* (2021.01)

(56) References Cited

FOREIGN PATENT DOCUMENTS

| | | | |
|---|---|---|---|
| WO | 2017082966 | A1 | 5/2017 |
| WO | 2017220155 | A1 | 12/2017 |
| WO | 2018001449 | A1 | 1/2018 |

OTHER PUBLICATIONS

SGP.22_v2.2_RSP_Technical_Specification_v2.2_Sep. 1, 2017 (Year: 2017).*
PCT International Search Report and Written Opinion dated Oct. 2, 2019 for International Application PCT/EP2018/052140, 12 pages.
GSM Association: "SGP. 22—RSP Technical Specification (Remote SIM Provisioning) v1.1", Jun. 9, 2016, 125 pages.
First Chinese Office Action for Chinese Patent Application No. CN 201880086640.5 dated Aug. 22, 2022, 37 pages.

* cited by examiner

PROFILE HANDLING OF A COMMUNICATIONS DEVICE

CROSS-REFERENCE TO RELATED APPLICATIONS

This application is a 35 U.S.C. § 371 national stage application of PCT International Application No. PCT/EP2018/052140 filed on Jan. 29, 2018, which in turns claims foreign priority to U.S. patent application Ser. No. 62/617,351, filed on Jan. 15, 2018, the disclosures and content of which are incorporated by reference herein in their entirety.

TECHNICAL FIELD

Embodiments presented herein relate to methods, a proxy device, communications device, a computer program, and a computer program product for profile handling of the communications device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is security. In general terms, proper security mechanisms are needed to prevent misuse of connected devices. As a non-limiting illustrative example, distributed denial of service (DDoS) attacks against popular websites might utilize poorly protected connected devices, such as cameras running the Internet Protocol (IP), routers, digital video recorders running the Internet Protocol, and so on.

Connected devices may also be entrusted with valuable, sensitive, or private data that needs to be protected from unauthorized access. Identity management is a central part of security and device life-cycle management. A connected device generally needs an identity to be able to identify and authenticate itself to its counterparts in the network in order to establish secure communication to other connected devices or services. This is needed at the connectivity layer when connecting to a network and at the application layer when connecting to a service of the network. Secure communication protects sensor data, or control data for actuators, but is also needed for provisioning of identities to the connected device and for secure configuration of the connected device, including secure firmware update. Identities are also the base for an access control mechanism controlling who can access resources of a connected device, including who can provision additional identities to the connected device.

A simplified block diagram of a communications network 100 is illustrated in FIG. 1. A connected device 120 is provided network access by a network node 110, such as a network gateway (GW) or an access point (AP) of a connectivity provider network 120. The connectivity provider network 120 further comprises an authentication server 130, which could be an authentication, authorization, and accounting (AAA) server. Subscriber information for connectivity may be stored in the authentication server 130 or may be stored in a separate network entity, which could be a home subscriber server (HSS) 140, and which separate network entity also provides authentication material for use by the authentication server 130. The connectivity provider network 120 in turn is operatively connected to a service network 150, such as the Internet, possibly comprising at least one second communications device 180 that could be a data server (DS). The service network 150 is further operatively connected to an enterprise network 160. The enterprise network 160 comprises a management server (MS) 170 and possibly at least one second communications device 180 that could be a DS.

As an example, the connected device 120 could belong to the enterprise of the enterprise network 160 and be configured to provide sensor data (or other type of data) to one or more of the second communications devices 180 located either in the enterprise network 160 or in the service network 150. The enterprise manages the connected device 120 through the management server 170. Management comprises providing identities and credentials to the connected device 120 and the second communications devices 180 to which the connected device 120 is communicating with such that secure communication can be established. The connectivity provider network 120 may, partly or fully, also be provided by the enterprise.

The so-called 3GPP identity technology, where 3GPP is short for third generation partnership project, is a well-proven identity technology that might be leveraged as identity technology for constrained devices, not only for constrained devices to access cellular networks, but also for other constrained devices to access non-cellular networks such as WiFi. The 3GPP Authentication and Key Agreement (AKA) protocol is agnostic to the underlying network and can for example be tunneled in the Extensible Authentication Protocol (EAP) using the EAP-AKA. EAP is a commonly used authentication and key agreement protocol as part of network attachment, e.g. for WiFi network access. Using EAP-AKA allows existing security infrastructure (e.g. at enterprises) to be used that easily can integrate with the authentication systems (such as HSS) of mobile network operators (MNOs).

Changing subscription from one mobile network operator to another is for mobile phones today mostly done by physically replacing the existing universal integrated-circuit card (UICC) or subscriber identity module or subscriber identification module (SIM) card with a new UICC/SIM card for the new mobile network operator. For constrained devices installed at remote locations and hard to reach places, sending out maintenance personnel for such an operation is a costly operation, and may even not be possible for some constrained devices (e.g. hermetically sealed constrained devices). Instead, a way of securely updating/changing the subscription from remote is needed.

The so-called embedded UICC (eUICC) is a dedicated UICC chip integrated into the device, i.e. it is not removable. However, at the same time, remote management of the eUICC and the subscriptions stored on it is provided such that users or device owners can change subscriptions for their devices and the new subscription data is provisioned onto the eUICC remotely. GSMA (GSM Association, where GSM is short for Global System for Mobile communication) has specified two variants of such a remote SIM provisioning protocol; one for consumer type devices and one for machine-to-machine (M2M) type devices. For the consumer variant the end-user controls the switch between profiles instead of the operator/remote provisioning server as in the M2M variant.

However, for constrained devices even the use of an embedded UICC may add unreasonable cost to the device. The next phase in the UICC evolution is the integrated UICC (iUICC) in which the UICC is integrated into the Systemon-Chip of the modem/application processor. There is today no exact definition of the iUICC. In some aspects, a dedicated central processing unit (CPU) core with its own dedicated memory and peripherals might constitute the iUICC. An iUICC may alternatively be realized using hardware isolation mechanisms such as ARM TrustZone or Intel SGX.

An overview of an architecture 400 for connectivity management in the to GSMA consumer variant is shown in FIG. 2. The end-user 410 owning and/or using the device may here order a new profile download from the MNO 420. The MNO 420 prepares a profile provisioning server, SM-DP+ 430 (short for enhanced Subscription Manager Data Preparation), for the profile download. The end-user 410 triggers the profile download (and switch of profile) via a Local Profile Assistant (LPAd) available in the device via a user interface. The LPAd comprises a Local Discovery (LDSd) entity, a Local Profile Download (LPDd) entity, and a Local User Interface (LUId) entity. The suffix d indicates that the entity is part of the communications device 120. An eUICC/iUICC manufacturer (EUM) 460 is the entity that manufactured the eUICC/iUICC. The manufacturer of an iUICC is typically the device manufacturer. The Certificate Issuer (CI) 450 is the issuer of certificates used in profile download and other operations. Operational interfaces are shown as directional arrows connecting the entities 120-460. For example, ES9+ is the interface between SM-DP+ 430 and LPAd/LPDd in the communications device 120, and ES10b is the interface between LPAd/LPDd and the eUICC/iUICC, whereas ES8+ is the interface between SM-DP+ 430 and the eUICC/iUICC in the communications device 120.

FIG. 3 is a signalling diagram of profile download to the device 120. For protection of the profile download secure communication is established between the eUICC/iUICC and the SM-DP+ 430 as well between the LPAd and the SM-DP+ 430.

The use of the GSMA consumer variant for constrained devices poses problems in that many constrained devices do not have a user interface for communication with the end-user/device owner 410. Instead the constrained device is managed and configured via a Management Server (MS) using a dedicated management protocol such as LightweightM2M (LwM2M). GSMA RSP defines the concept companion device and primary device where a companion device is a device that relies on the primary device for connectivity and user interface during profile provisioning and local profile management. Secure communication is mandated between the companion and primary device for protection of the profile management operations and HTTPS (short for HTTP Secure, where HTTP is short for Hypertext Transfer Protocol) might be used for secure communications.

However, constrained devices might not support the use of HTTPS. Instead, the so-called Constrained Application Protocol (CoAP) is often used as application protocol. Besides for secure communication between the companion device and the primary device, the consumer variant also standardizes HTTPS connection to secure the communication between the LPAd and the SM-DP+ 430. Introducing support for HTTPS in constrained devices, in addition to already existing protocols for communicating with application servers, requires more memory in the constrained device.

Hence, there is still a need for improved handling of profiles for communications devices, such as constrained devices.

SUMMARY

An object of embodiments herein is to provide efficient handling of profiles for communications devices, such as constrained devices.

According to a first aspect there is presented a method for profile handling of a communications device. The method is performed by a local profile assistant of a proxy device. The method comprises obtaining an indication of handling a profile of the communications device. The method comprises establishing a first secure communications link with a local profile assistant of the communications device. The method comprises establishing a second secure communications link with a subscription management entity of the communications device. The method comprises receiving information pertaining to handling of the profile by the local profile assistant of the communications device, the information being received from the subscription management entity over the second secure communications link. The method comprises providing the information to the local profile assistant of the communications device over the first secure communications link.

According to a second aspect there is presented a proxy device for profile handling of a communications device. The proxy device comprises processing circuitry. The processing circuitry is configured to cause a local profile assistant of the proxy device to obtain an indication of handling a profile of the communications device. The processing circuitry is configured to cause a local profile assistant of the proxy device to establish a first secure communications link with a local profile assistant of the communications device. The processing circuitry is configured to cause a local profile assistant of the proxy device to establish a second secure communications link with a subscription management entity of the communications device. The processing circuitry is configured to cause a local profile assistant of the proxy device to receive information pertaining to handling of the profile by the local profile assistant of the communications device, the information being received from the subscription management entity over the second secure communications link. The processing circuitry is configured to cause a local profile assistant of the proxy device to provide the information to the local profile assistant of the communications device over the first secure communications link.

According to a third aspect there is presented a proxy device for profile handling of a communications device. The proxy device comprises an obtain module configured to, by a local profile assistant in the proxy device, obtain an indication of handling a profile of the communications device. The proxy device comprises an establish module configured to, by the local profile assistant in the proxy device, establish a first secure communications link with a local profile assistant of the communications device. The proxy device comprises an establish module configured to, by the local profile assistant in the proxy device, establish a second secure communications link with a subscription management entity of the communications device. The proxy device comprises a receive module configured to, by the local profile assistant in the proxy device, receive information pertaining to handling of the profile by the local profile assistant of the communications device, the information being received from the subscription management entity over the second secure communications link. The proxy device comprises a provide module configured to, by the local profile assistant in the proxy device, provide the information to the local profile assistant of the communications device over the first secure communications link.

According to a fourth aspect there is presented a computer program for profile handling of a communications device, the computer program comprising computer program code which, when run on processing circuitry of a proxy device, causes a local profile assistant of the proxy device to perform a method according to the first aspect.

According to a fifth aspect there is presented a method for profile handling of a communications device. The method is performed by the communications device. The method comprises establishing a first secure communications link with a local profile assistant of a proxy device. The method comprises receiving information pertaining to handling of a profile by a local profile assistant of the communications device, the information being received from the proxy device over the first secure communications link.

According to a sixth aspect there is presented a communications device for profile handling of the communications device. The communications device comprises processing circuitry. The processing circuitry is configured to cause a local profile assistant of the communications device to establish a first secure communications link with a local profile assistant of a proxy device. The processing circuitry is configured to cause a local profile assistant of the communications device to receive information pertaining to handling of a profile by a local profile assistant of the communications device, the information being received from the proxy device over the first secure communications link.

According to a seventh aspect there is presented a communications device for profile handling of the communications device. The communications device comprises an establish module configured to, by a local profile assistant in the communications device, establish a first secure communications link with a local profile assistant of a proxy device. The communications device comprises a receive module configured to, by the local profile assistant in the communications device, receive information pertaining to handling of a profile by a local profile assistant of the communications device, the information being received from the proxy device over the first secure communications link.

According to an eight aspect there is presented a computer program for profile handling of a communications device, the computer program comprising computer program code which, when run on processing circuitry of the communications device, causes a local profile assistant of the communications device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these proxy devices, these communications devices, and these computer programs provide efficient handling of profiles for communications devices, such as constrained devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above there is still a need for improved handling of profiles for communications devices, such as constrained devices.

The embodiments disclosed herein therefore relate to mechanisms for profile handling of a communications device 300. In order to obtain such mechanisms there is provided a proxy device 200, a method performed by the proxy device 200, a computer program product comprising code, for example in the form of a computer program, that when run on processing circuitry of the proxy device 200, causes the proxy device 200 to perform the method. In order to obtain such mechanisms there is further provided a communications device 300, a method performed by the communications device 300, and a computer program product comprising code, for example in the form of a computer program, that when run on processing circuitry of the communications device 300, causes the communications device 300 to perform the method.

Figure 4:
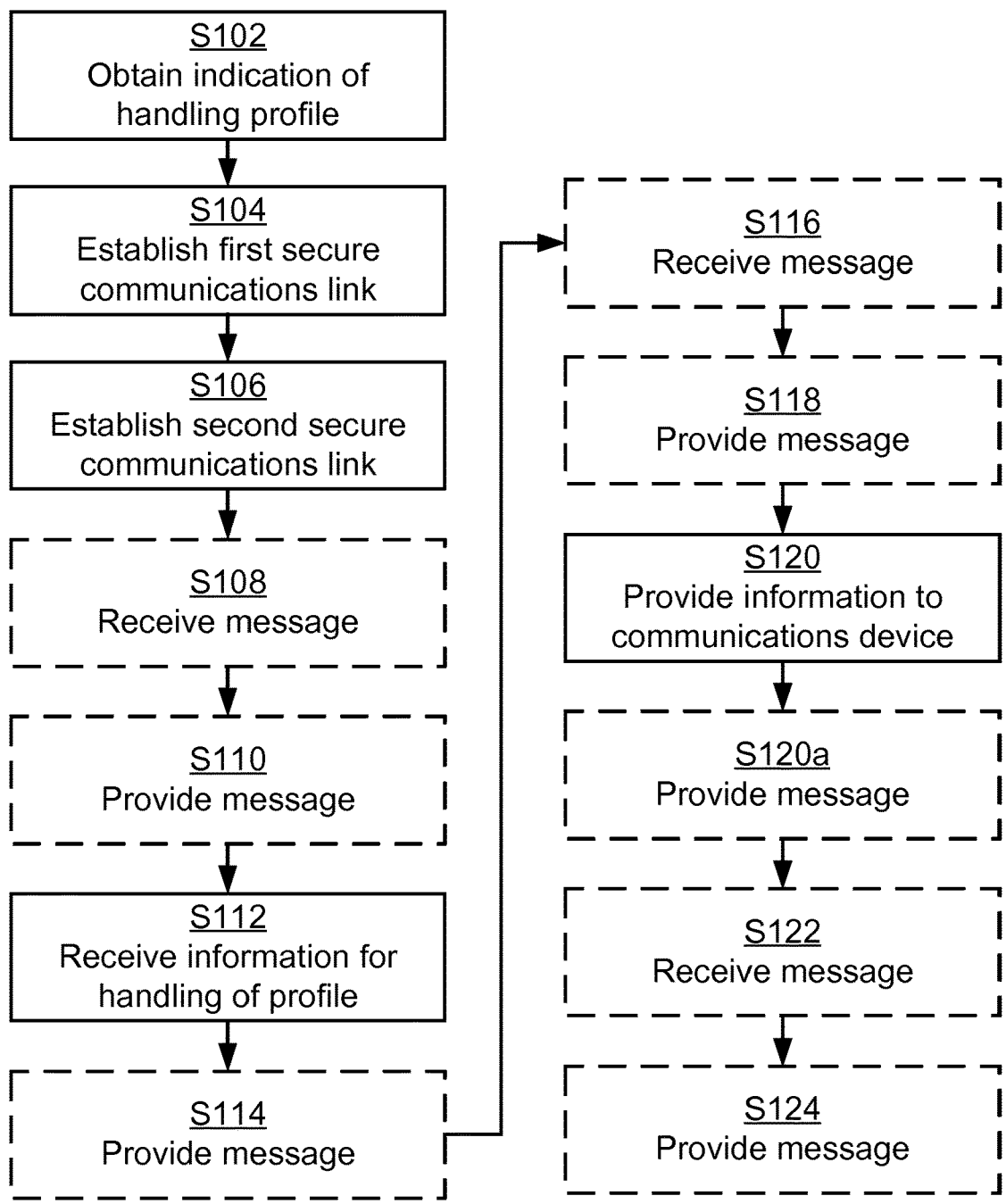
FIGS. 4 and 5 are flowcharts of methods according to embodiments.

Reference is now made to FIG. 4 illustrating a method for profile handling of a communications device 300 as performed by a local profile assistant 200a of the proxy device 200 according to an embodiment.

S102: An indication of handling a profile of the communications device 300 is obtained.

S104: A first secure communications link is established with a local profile assistant 300a of the communications device 300.

S106: A second secure communications link is established with a subscription management entity of the communications device 300.

S112: Information is received pertaining to handling of the profile by the local profile assistant 300a of the communications device 300, the information being received from the subscription management entity over the second secure communications link.

S120: The information is provided to the local profile assistant 300a of the communications device 300 over the first secure communications link.

This method allows the consumer variant of the GSMA RSP protocol to be used for provisioning of 3GPP profiles to communications devices 300 having either an eUICC or an iUICC. One advantage is that the device owner/user is in control of profile management. This means that costs associated with profile management as rendered when using the M2M variant is avoided.

This method leverages the already existing protocol stack in the communications device 300 for secure communication with another device or server such as the protocol stack for device management, and avoids support for HTTPS in the communications device 300, which allows to save memory in the communications device 300 compared to an implementation of the M2M profile. This is visible especially for communications devices 300 that implement an iUICC (using e.g. TrustZone isolation), which is a cost-effective solution for constrained devices.

The proxy device 200 allows offloading of parts of the GSMA RSP protocol from the communications device 300 which can reduce memory (code size and random access memory (RAM) usage) and save power by the communications device 300 transmitting (as well as receiving) fewer bits.

Advantageously, the profile is still protected end-to-end between the SM-DP+ 430 and the eUICC/iUICC in the communications device 300.

Advantageously, the use of the proxy device 200 is transparent to the SM-DP+ 430 and to the eUICC/iUICC. Thus no changes are required in the SM-DP+ 430 or in the eUICC/iUICC.

Embodiments relating to further details of profile handling of a communications device 300 as performed by the proxy device 200 will now be disclosed.

There may be different kinds of indications of handling the profile as obtained in step S102.

In some aspects the indication concerns downloading a profile. Particularly, according to an embodiment, the indication of handling the profile pertains to download of the profile to the communications device 300.

Then, when the indication concerns downloading a profile, the information received in step S112 might be the profile itself in protected form. Thus, according to an embodiment, the information is the profile itself in protected form.

In some aspects the indication concerns management of an existing profile. Particularly, according to an embodiment, the indication of handling the profile pertains to management of an existing profile in the communications device 300. The indication may be a request for a particular management operation to be sent as a management command from the proxy device 200 to the communications device 300 (so called local profile management operation), or an indication for the communications device 300 to (via the proxy device 200) check for any remote profile management operations at the subscription management entity.

Then, when the indication concerns management of an existing profile, the information received in step S112 might, in the case of remote profile management operations, be a management command. Thus, according to an embodiment, the information is a command pertaining to management of the profile.

There could be different kinds of management of the existing profile.

In some aspects the existing profile is currently enabled. Then, according to an embodiment, the management pertains to disabling the profile.

In some aspects the existing profile is currently disabled. Then, according to an embodiment, the management pertains to enabling the profile.

In some aspects the command is for deletion of the profile. That is according to an embodiment, the management pertains to deletion of the existing profile from the communications device 300.

In some aspects, the commands are signed by the local profile assistant 200a of the proxy device 200 before being sent to the local profile assistant 300a of the communications device 300 in order for the local profile assistant 300a of the communications device 300 to be able to verify that the commands are from a trusted proxy device 200. Particularly, according to an embodiment, the information provided to the local profile assistant 300a of the communications device 300 is digitally signed by the proxy device 200.

In some aspects the messages exchanged between the proxy device 200 and the communications device 300 are compressed. In this respect the messages are compressed by having a reduced content compared to prior art messages. Examples of messages that might be compressed in this way are given in embodiments defined by below steps S108-S122.

S108: An AuthenticateServerResponse message is received from the communications device 300 pertaining to authentication of the subscription management entity at the communications device 300, wherein the AuthenticateServerResponse message lacks iUICC certificate or eUICC certificate, EUM certificate (and possibly other intermediate CA certificates chaining back to the root CA certificate), eUICC/iUICC information, transaction ID, server address, server challenge, and device information. Examples of eUICC/iUICC information and device information, when using ASN.1 notation of AuthenticateServerResponse message/structure, are to eUICCInfo2 and ctxParams1, respectively.

Hereinafter the term "lacks" might be interpreted as the parameters that are lacking never having been part of the message, or that the parameters have been removed, or excluded from the message before the message is sent by the message sender.

S110: An AuthenticateClient message is provided to the subscription management entity pertaining to authentication of the communications device 300 at the subscription management entity, wherein the AuthenticateClient message comprises the iUICC certificate, the EUM certificate (and possibly other intermediate CA certificates chaining back to the root CA certificate), eUICC/iUICC information, transaction ID, server address, server challenge, and device information.

S114: A PrepareDownloadRequest message is provided to the communications device 300, wherein the PrepareDownloadRequest message comprises data for preparing profile download to the communications device 300 but lacks transaction ID.

S116: A PrepareDownloadResponse message is received from the communications device 300 pertaining to successful preparation of download of the profile to the communications device 300, wherein the PrepareDownloadResponse message lacks transaction ID and hash of the confirmation code.

S118: An GetBoundProfilePackage message is provided to the subscription management entity pertaining to retrieving the Bound Profile Package from the subscription management entity, wherein the GetBoundProfilePackage message comprises the transaction ID and the hash of the confirmation code.

S120a: An InstallBPP message is provided to the communications device 300, wherein the InstallBPP message comprises the profile (in protected form) but lacks transaction ID.

Step S120a might be part of above defined step S120.

S122: A first status message is received from the communications device 300 to over the first secure communications link relating to status of the information provided to the local profile assistant 300a of the communications device 300.

S124: A second status message is provided to the subscription management entity over the second secure communications link in response thereto, wherein content of the second status message being based on the status of the information provided to the local profile assistant 300a of the communications device 300.

According to an embodiment, the first status message is a ProfileInstallationResult message, wherein the ProfileInstallationResult message lacks transaction ID, profile management operation information, notification address, and the object identifier of the subscription management entity (e.g. SM-DP+ 430), and wherein the second status message is a HandleNotification message, wherein the HandleNotification message comprises the transaction ID, profile management operation information, notification address, and the object identifier of the subscription management entity.

There are different procedures that could take place when the second secure communications link is established.

In some aspects a certificate (CERT) is provided from the proxy device 200. Particularly, according to an embodiment, establishing the second secure communications link comprises providing a certificate from the proxy device 200 to the subscription management entity.

In some aspects the proxy device 200 signs an ephemeral elliptic curve (EC) public key and provides the signed ephemeral EC public key to the communications device 300 when setting up the secure connection. Particularly, according to an embodiment, establishing the second secure communications link comprises digitally signing an ephemeral EC public key to and providing the signature from the proxy device 200 to the communications device 300.

Figure 5:
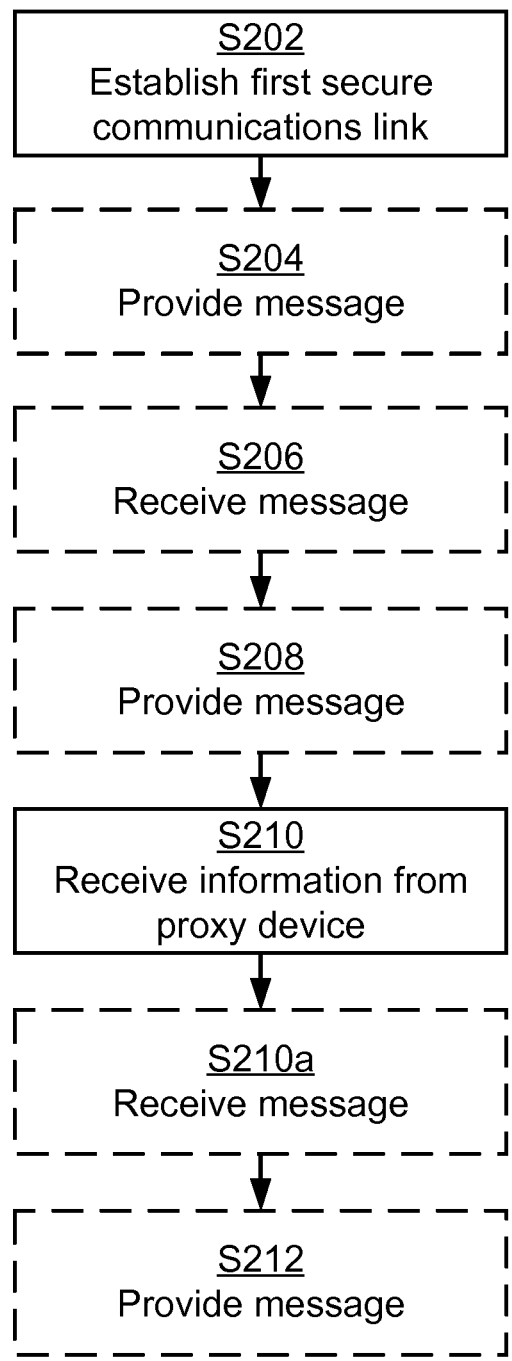

Reference is now made to FIG. 5 illustrating a method for profile handling of a communications device 300 as performed by a local profile assistant 300a of the communications device 300 according to an embodiment.

S202: A first secure communications link is established with a local profile assistant 200a of a proxy device 200.

S210: Information pertaining to handling of a profile by a local profile assistant 300a of the communications device 300 is received, the information being received from the proxy device 200 over the first secure communications link.

Embodiments relating to further details of profile handling of a communications device 300 as performed by the communications device 300 will now be disclosed.

As disclosed above, according to an embodiment, the information is the profile itself in protected form.

As disclosed above, according to an embodiment, the information is a command pertaining to management of the profile. As disclosed above, according to an embodiment, the management pertains to disabling the currently enabled profile. As disclosed above, according to an embodiment, the management pertains to enabling the profile. As disclosed above, according to an embodiment, the management pertains to deletion of the profile from the communications device 300.

Further, messages from the LPApr 200a for enabling, disabling and deleting a profile might be signed by the LPApr 200a (and verified by the LPAdv 300a). Hence, according to an embodiment, the information received from the proxy device 200 has been digitally signed by the proxy device 200. The communications device 300 might then be configured for verifying the signature before executing the enabling, disabling, or deleting of the profile.

There could be some instances where the profile should not be deleted and therefore where mechanisms are in place that prevents such deletion. Particularly, a provisioning profile used for initial connectivity might never be deleted. That is, according to an embodiment, when the existing profile is for initial connectivity, the communications device 300 does not delete the exiting profile from the communications device 300.

As disclosed above, in some aspects the messages exchanged between the proxy device 200 and the communications device 300 are compressed. In this respect the messages are compressed by having a reduced content compared to prior art messages. Examples of messages that might be compressed in this way are given in embodiments defined by below steps S204-S212.

S204: An AuthenticateServerResponse message is provided to the proxy device 200 pertaining to authentication of the subscription management entity at the communications device 300, wherein the AuthenticateServerResponse message excludes iUICC certificate or eUICC certificate, EUM certificate (and possibly other intermediate CA certificates chaining back to the root CA certificate), eUICC/iUICC information, transaction ID, server address, server challenge, and device information. Examples of eUICC/iUICC information and device information, when using ASN.1 notation of AuthenticateServerResponse message/structure, are eUICCInfo2 and ctxParams1, respectively.

S206: A PrepareDownloadRequest message is received from the proxy device 200, wherein the PrepareDownloadRequest message comprises data for preparing profile download to the communications device 300 but lacks transaction ID.

S208: A PrepareDownloadResponse message is provided to the proxy device 200 pertaining to successful preparation of download of the profile to the communications device 300, wherein the PrepareDownloadResponse to message lacks transaction ID and hash of the confirmation code.

S210a: An InstallBPP message is received from the proxy device 200, wherein the InstallBPP message comprises the protected profile but lacks transaction ID.

Step S210a might be performed as part of above defined step S210.

S212: A first status message is provided to the proxy device 200 over the first secure communications link relating to status of the information provided to the local profile assistant 300a of the communications device 300.

According to an embodiment, the first status message is a ProfileInstallationResult message, wherein the ProfileInstallationResult message lacks transaction ID, profile management operation information, notification address, and the object identifier of the subscription management entity.

There could be different types of secure communications links that are set up. According to an embodiment, the first secure communications link is based on Transport Layer Security (TLS) or Datagram Transport Layer Security (DTLS). According to an embodiment, the second secure communications link is based on HTTPS.

There could be different types of protocols that are used for the communications between the proxy device 200 and the communications device 300. According to an embodiment, the proxy device 200 and the communications device 300 communicate using LwM2M protocol messages.

There could be different types of subscription management entities. According to an embodiment, the subscription management entity is an SM-DP+ 430.

Further examples, aspects, and embodiments relating to profile handling of the communications device 300 will now be disclosed.

In some aspects the communications device 300 use a 3GPP identity for attaching to a network such as GSM, Universal Mobile Telecommunications System (UMTS), Long Term Evolution (LTE), or WiFi. The identity consists typically of an identifier and associated credentials. The communications device 300 might be equipped with either an embedded UICC (eUICC) or an integrated UICC (iUICC) for storing the 3GPP identity information, which is here also referred to as a 3GPP profile. The eUICC/iUICC might support functionality for remote provisioning of profiles according to GSMA RSP consumer variant.

The communications device 300 is typically a constrained device with regards to having a limited amount of memory and processing power and not having a user interface and that the provisioning of profiles is done via a proxy that is assisting the communications device 300 with parts of the provisioning. Depending on the type of connectivity the eUICC/iUICC may need to be provisioned at manufacturing or system integration with a provisioning profile allowing initial connectivity such that provisioning of an operational profile can be made. Alternatively, initial connectivity may be provided through an open network.

As disclosed above, the functionality for local management of profiles provided by the Local Profile Assistant (LPAd) is split between the proxy device 200 and the communications device 300. These two parts of the LPAd will hereinafter be referred to as LPApr 200a and LPAdv 300a. In some aspects the split is according to the following. LPApr 200a handles the HTTPS sessions with SM-DP+ 430 (and SM-DS 440). LPApr 200a handles the interaction with the user/owner of the device. LPAdv 300a handles the interaction with the eUICC/iUICC.

Figure 2:
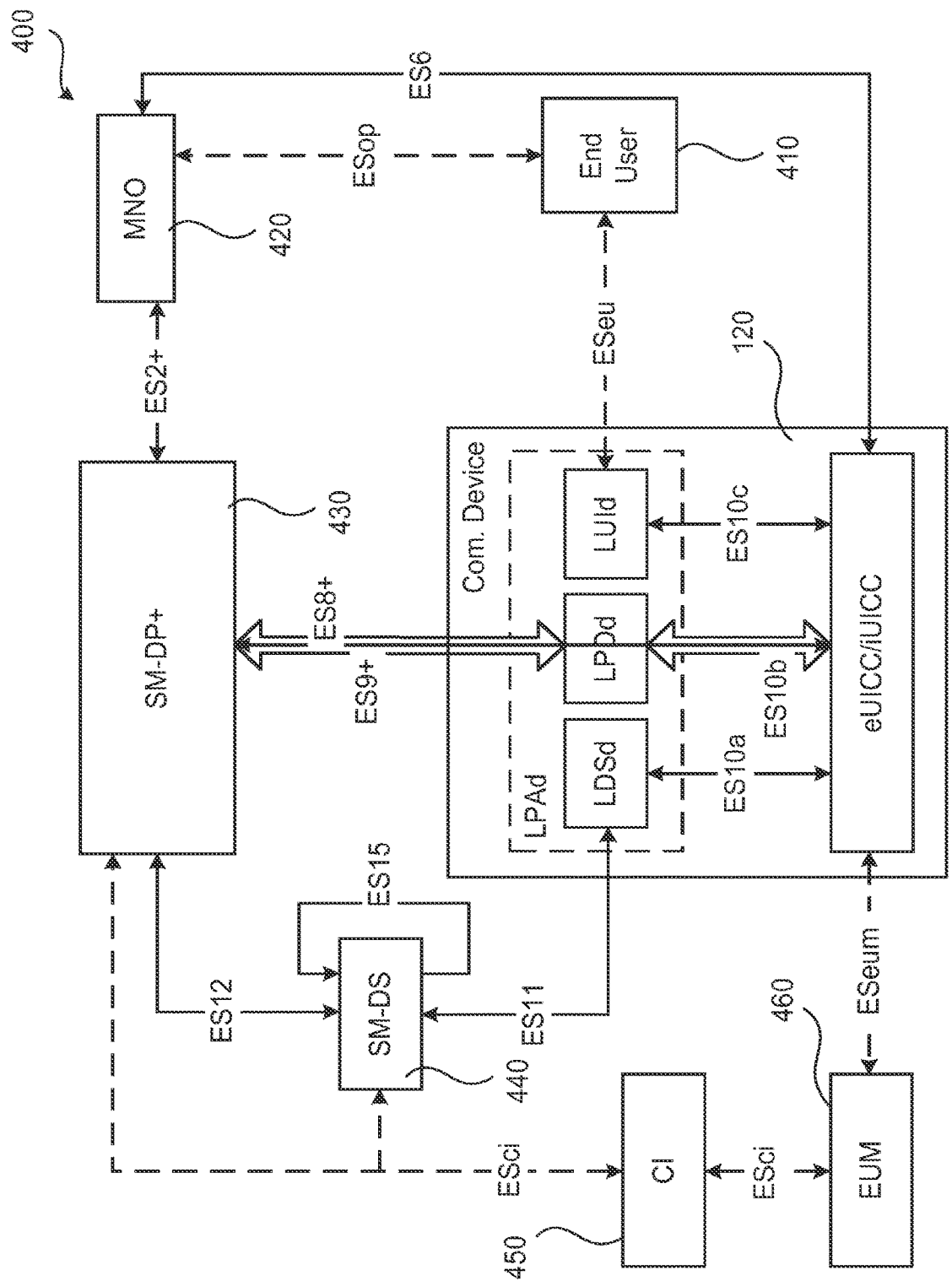
FIG. 2 is a schematic illustration of an architecture for connectivity management.
Figure 3:
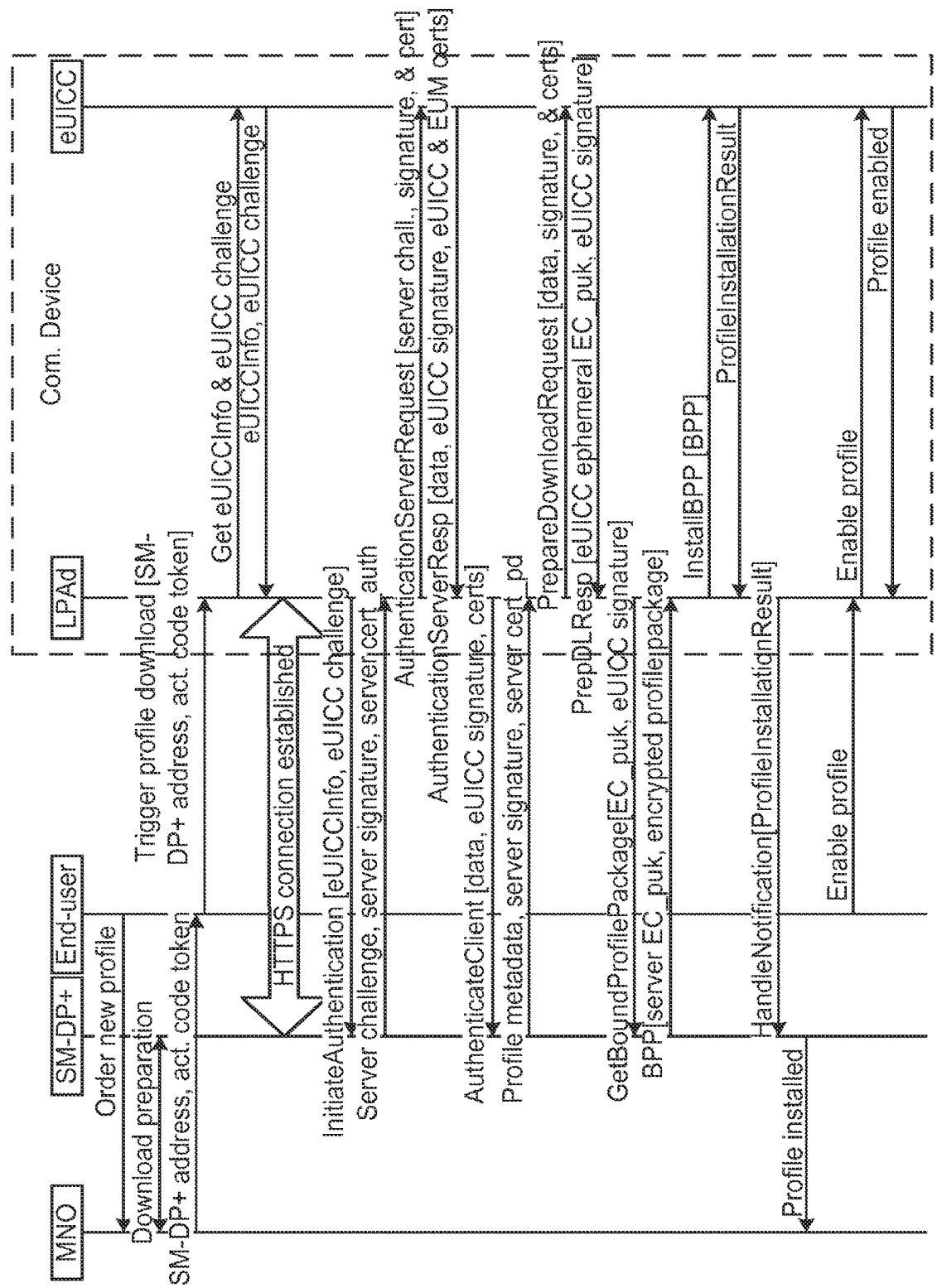
FIG. 3 is a signalling diagram.
Figure 6:
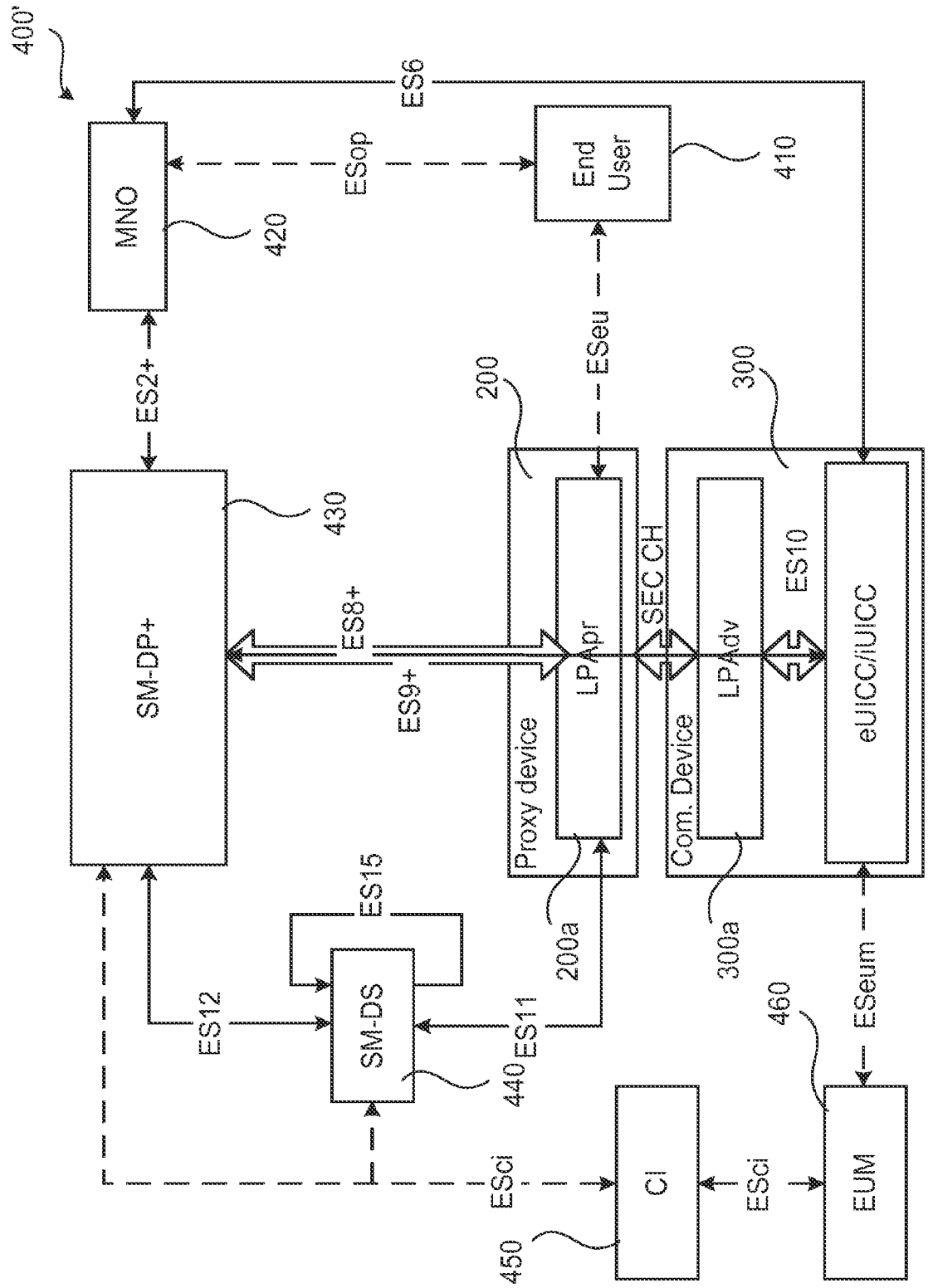
FIG. 6 is a schematic illustration of an architecture for connectivity management according to embodiments.

A secure communication protocol is established between LPApr 200a and LPAdv 300a using a protocol stack suitable for the communications device 300. Such secure communication can for example be based on TLS/DTLS using certificate, public key (RPK mode), or pre-shared key (PSK mode). This to can be used to prevent unauthorized local management operations. Dedicated keys for securing the communication may be set up or provisioned as part of the initial configuration of the communications device 300 done as part of device installation and/or commissioning phase. Alternatively, keys might be provisioned already at the manufacturing or system integration phase. An example setup is shown in FIG. 6. FIG. 6 is a schematic illustration of an architecture 400' for connectivity management according to embodiments. In comparison to the architecture 400 in FIG. 2, the architecture 400' of FIG. 6 comprises the proxy device 200 and the functionality of the LPA is split between the proxy device 200 (comprising the LPApr 200a, where the suffix pr indicates the LPA part that is part of the proxy device 200) and the communications device 300 (comprising the LPAdv 300a, where the suffix dv indicates the LPA part that is part of the communications device 300).

The functionality of the proxy device 200 might be implemented in the Management Server (MS) handling management of the communications device 300. The secure communication between LPApr 200a and LPAdv 300a might be leveraging an already existing secure communication established between the proxy device 200 and the communications device 300. If functionality of the proxy device 200 is implemented in the MS then the already existing secure communication for secure management of the communications device 300 may be utilized. For example, the LwM2M protocol used on top of CoAP may be used as the device management protocol secured using the DTLS protocol.

The communications interface between LPApr 200a and LPAdv 300a is essentially the ES10 interface but with compression of messages as disclosed herein and with an extra security layer to ensure secure communication and proper access control. In the case of the communications device 300 comprising an iUICC, a functional interface may be used instead of the APDU interface defined for eUICC. In case the functionality of the proxy device 200 is implemented is the MS, the management protocol for communications between the MS and communications device 300 could be utilized. For example, in the case of LwM2M a new LwM2M object might be introduced with a number of resources, where operations with associated data can be sent to the eUICC/iUICC. In case the functionality of the proxy device 200 is implemented is the MS, an existing interface control for interacting with the user/owner that can be utilized for authentication and access.

Aspects of profile download will now be disclosed.

Figure 7:
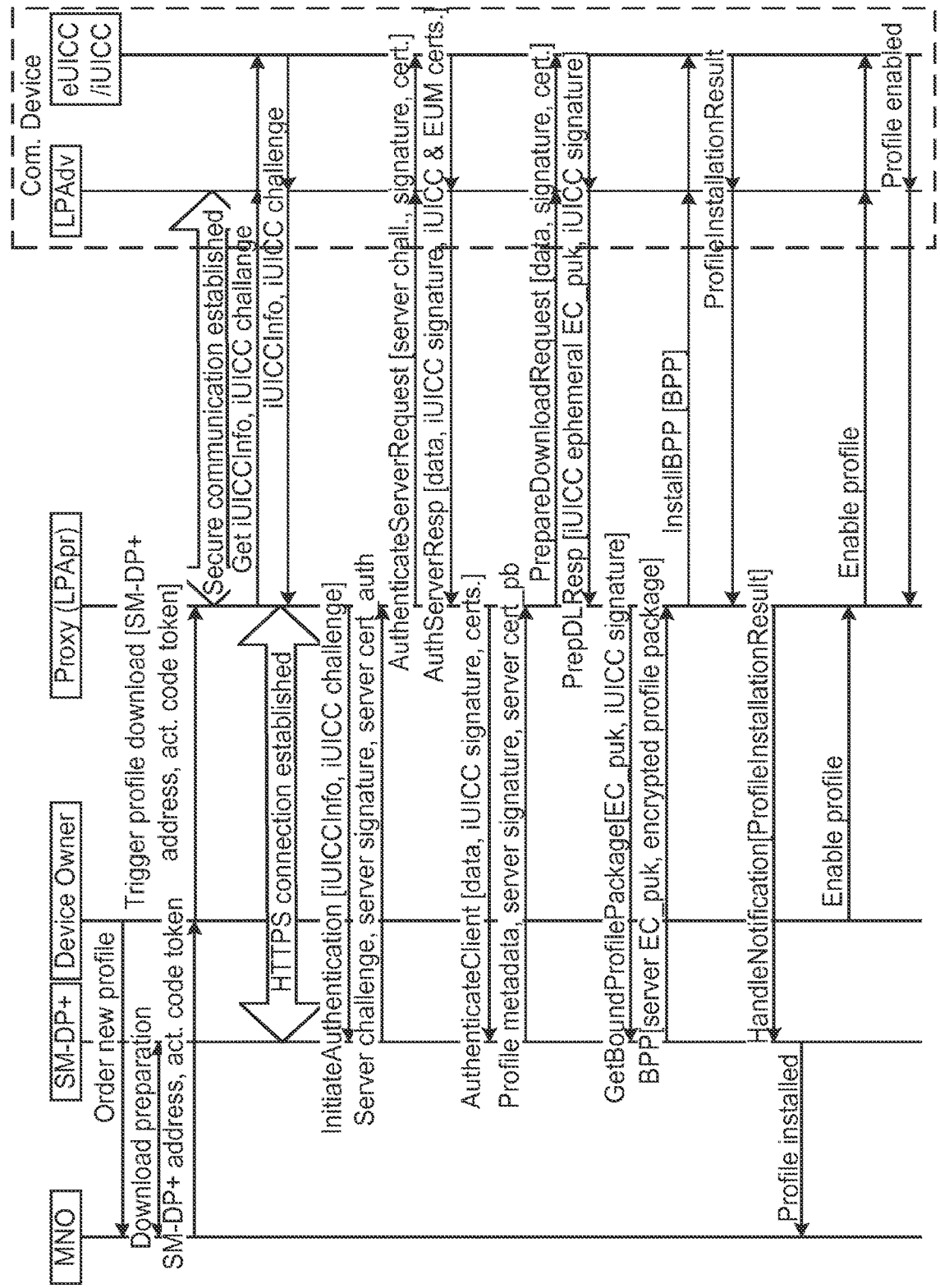
FIGS. 7 and 8 are signalling diagrams according to embodiments.

FIG. 7 is a signalling diagram of a profile download according to an embodiment based on an adapted consumer variant protocol. Secure communications is established between the proxy device 200 and the communications device 300. This may be based on DTLS. The transfer of messages between LPApr 200a and LPAdv 300a may utilize the LwM2M protocol. The proxy device 200 is handling the HTTPS session with the SM-DP+ 430.

The messages in FIG. 7 will now be disclosed. It is noted that although the term iUICC is used for parameters in the messages, this is to be interpreted as eUICC/iUICC, i.e., eUICC or iUICC, depending on the actual implementation in the communications device 300.

Order new profile, download preparation, and response back to device owner: The device owner/user 410 contacts the MNO 420 and orders a new subscription. This triggers the MNO 420 to interact with the SM-DP+ 430 to prepare the profile download. The MNO 420 obtains the SM-DP+ 430 address and an activation code token which is provided back to the device owner/user. Optionally the confirmation code is also received.

Trigger profile download: The device owner/user 410 triggers the profile download via the LPApr 200a and provides the activation code token and SM-DP+ 430 address (and possibly confirmation code).

Secure communication with counterparts and retrieve necessary information from eUICC/iUICC: The LPApr 200a establishes secure communication with the communications device 300 and obtains eUICC/iUICC information (if not already available at LPApr 200a) and challenge from the eUICC/iUICC and then establishes an HTTPS secure communication with the SM-DP+ 430.

Initiate authentication: The LPApr 200a initiates authentication (read eUICC/iUICC information and challenge is provided as parameters) and the SM-DP+ 430 responds with a server challenge, signature (on server challenge and eUICC/iUICC challenge), and server certificate (and possibly intermediate CA certificates chaining back to the root CA certificate).

Authenticate server: LPApr 200a sends request for authentication of the server to the eUICC/iUICC in which server challenge, signature, and certificate (and possibly intermediate CA certificates) is included. The request might, optionally, comprise an operation parameter that indicates the operation, such as profile download and RPM operation, to be performed at the SM-DP+. The default operation, if the operation parameter is not present, might be for profile download. The eUICC/iUICC then authenticates the SM-DP+ 430 by validating the server certificate (and possibly intermediate CA certificates) and server signature and checking that the signed eUICC/iUICC challenge matches the sent one. Upon successful authentication, the eUICC/iUICC signs the server challenge, device information, and operation parameter (if available), provided by the LPApr 200a, and eUICC/iUICC data and responds with the signed data, signature, the eUICC/iUICC certificate, and an EUM certificate (and possibly other intermediate CA certificates chaining back to the root CA certificate).

AuthenticateClient: The LPApr 200a provides the signed data, signature, the eUICC/iUICC certificate, and the EUM certificate (and possibly other intermediate CA certificates) in the AuthenticateClient command to the SM-DP+ 430 that authenticates the client by verifying the certificates and eUICC/iUICC signature (and check that signed server challenge matches sent challenge). Upon successful authentication, the SM-DP+ 430 determines the operation to be performed (based on the operation parameter or default value if not present). In the present case the operation is profile download and the SM-DP+ provides signed profile metadata and a certificate (and possibly intermediate CA certificates chaining back to the root CA certificate) for profile binding as a response.

Prepare download: LPApr 200a sends prepare download request comprising the signed profile metadata and certificate (and possibly intermediate CA certificates) to the eUICC/iUICC that validates the signature and certificate(s). The request may also include the hashed confirmation code. Upon successful verification, the eUICC/iUICC generates an ephemeral EC key pair that is signed by the eUICC/iUICC (together with confirmation code hash and some additional data). The signed data (including EC public key and hash of CC) and signature is sent to the LPApr 200a as a response.

GetBoundProfilePackage: LPApr 200a provides signed data and signature in the GetBoundProfilePackage command to the SM-DP+ 430. The SM-DP+ 430 verifies the signature and, upon successful verification, generates SM-DP+ 430 ephemeral EC key pair, derives the session keys (e.g. using Diffie-Hellman key agreement) and creates a bound profile package (BPP) using the session keys. The BPP includes the SM-DP+ 430 ephemeral EC key pair, the encrypted and integrity protected profile, and a signature of the SM-DP+ 430 on the ephemeral EC public key. The BPP is then provided as a response to the LPApr 200a.

InstallBPP: The LPApr 200a triggers the installation of the BPP at the eUICC/iUICC. The BPP may be provided in chunks (i.e. several calls of InstallBPP command). The eUICC/iUICC parses the BPP, extracts the SM-DP+ 430 ephemeral EC public key (after verifying the SM-DP+ 430 signature), derives the session keys, verifies and decrypts the different BPP segments to obtain the UPP (short for unencrypted profile package), and parses the UPP to extract the profile data. The BPP segments may thus come in several calls to InstallBPP that are decrypted and parsed in chunks. Upon complete successful profile download (or in case of error at any point) the to eUICC/iUICC responds to the LPApr 200a with the ProfileInstallationResponse structure.

HandleNotification & Profile installed: The LPApr 200a calls the HandleNotification command with the ProfileInstallationResponse structure such that the SM-DP+ 430 can validate the result of the installation and notify the MNO 420.

Enable profile: The device owner/user might then trigger LPApr 200a to enable the new profile using the UI provided by the LPApr 200a. LPApr 200a then sends command to device (eUICC/iUICC) to enable the profile.

The messages illustrated in FIG. 7 are not compressed. Possible ways to compress some of the messages in FIG. 7 will be disclosed below.

The enable profile command of FIG. 7 is an example of local profile management operations. Here the device owner/user 410 triggers the LPApr 200a to send management command to the communications device 300. Management operations may also be triggered from the MNO 420 or third party acting on behalf of the MNO 420. This is referred to as remote profile management (RPM) and the corresponding operations, or commands, are referred to as RPM operations. Examples of RPM operations include, but are not limited to, enabling, disabling, and deleting profiles, listing profile information, and updating profile data and metadata. A profile that supports RPM may include the address of at least one subscription management entity (decided by the operator) that is allowed to perform RPM operations. RPM operations are initiated from the LPApr 200a similar to profile download operations. The device owner/user 410 may trigger, or issue, RPM operations. Additionally or alternatively, there might in LPApr 200a or LPAdv 300a be implemented a mechanism for automatically and periodically check if there are any pending RPM operations. In some aspects it is not possible via RPM operations to enable a profile if another profile, owned by another MNO 420, is currently enabled. For such a case local profile management would then be needed.

Figure 8:
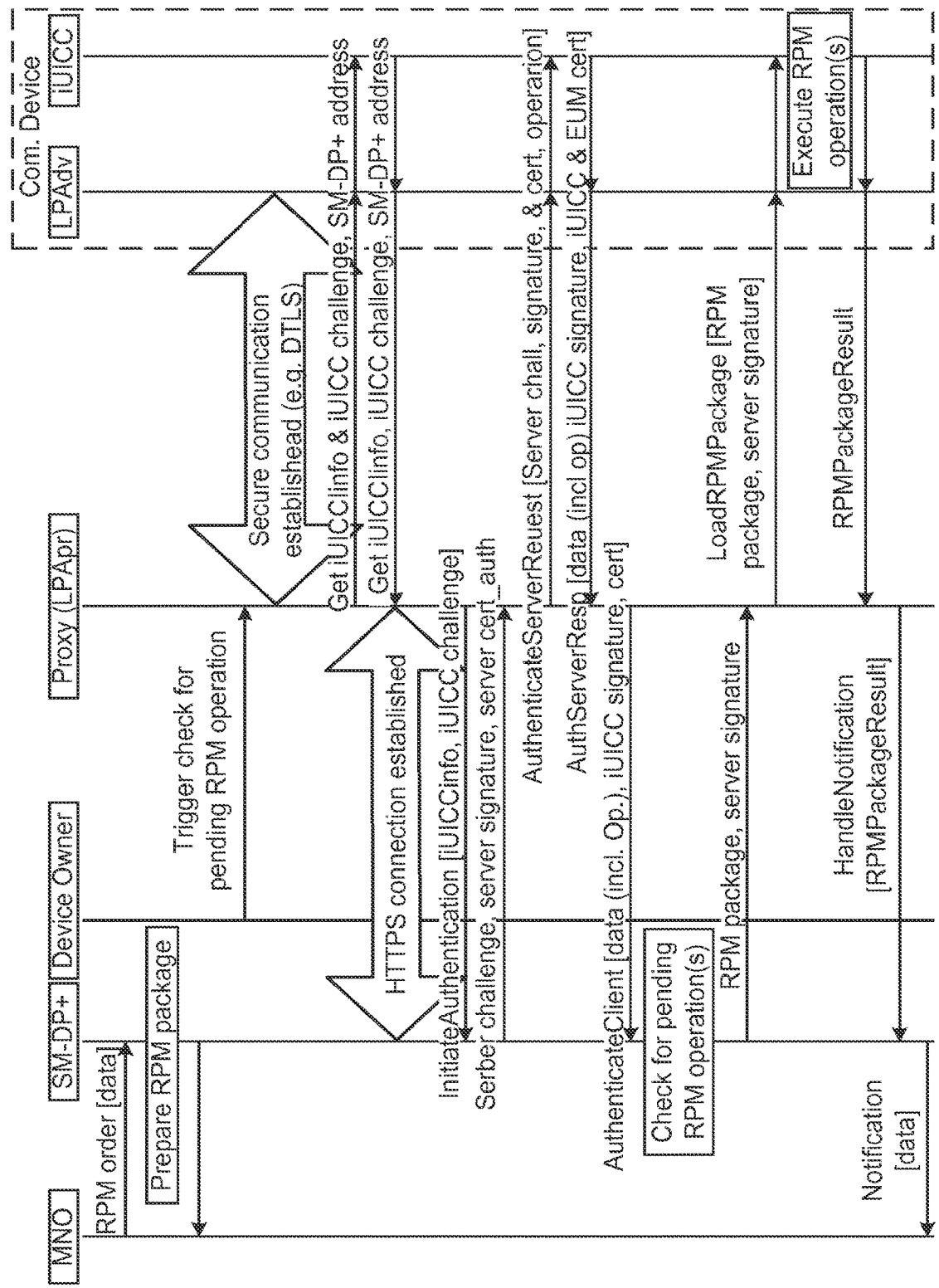

FIG. 8 is a signaling diagram of an RPM operation according to an embodiment based on an adapted consumer variant protocol. The transfer of messages between LPApr 200a and LPAdv 300a may utilize the LwM2M protocol. The proxy device 200 is handling the HTTPS session with the SM-DP+ 430.

The messages in FIG. 8 will now be disclosed. It is noted that although the term iUICC is used for parameters in the messages, this is to be interpreted as eUICC/iUICC, i.e., eUICC or iUICC, depending on the actual implementation in the communications device 300.

RPM order: The MNO 420 orders one or more RPM operations from the subscription management entity. The order comprises information to identify the eUICC/iUICC and/or the profile (e.g. eUICC ID (EID) and integrated circuit card identifier (ICCID)) and might include data such as profile metadata to be updated. The subscription management entity prepares an RPM package to be provided to the eUICC/iUICC.

Trigger check for pending RPM operation: The device owner/user 410 triggers (or periodically triggers through a timer) the LPApr 200*a* to check for pending remote management operations at the subscription management entity.

Secure communication with counterparts and retrieve necessary information from eUICC/iUICC: The LPApr 200*a*, by means of the proxy device 200, establishes secure communication with the communications device 300 and obtains eUICC/iUICC information (if not already available at LPApr 200*a*) and challenge and potentially also the address of the subscription management entity (if not already known) and then establishes an HTTPS secure communication with the SM-DP+ 430.

Initiate authentication: The LPApr 200*a* initiates authentication (read eUICC/iUICC information and challenge is provided as parameters) and the SM-DP+ 430 responds with a server challenge, signature (on server challenge and eUICC/iUICC challenge), and server certificate (and possibly intermediate CA certificates chaining back to the root CA certificate).

Authenticate server: LPApr 200*a* sends a request for authentication of the server to the eUICC/iUICC in which server challenge, signature, certificate (and possibly intermediate CA certificates), and operation is included. The operation parameter indicates the operation to be performed at the SM-DP+, such as profile download and RPM operation. Default operation if operation parameter is not present might be for profile download. The eUICC/iUICC authenticates the SM-DP+ 430 by validating the server certificate (and possibly intermediate CA certificates) and server signature and checking that the signed eUICC/iUICC challenge matches the sent one. Upon successful authentication, the eUICC/iUICC signs the server challenge, device information and operation parameter provided by the LPApr 200*a* and eUICC/iUICC data, and responds with the signed data, signature, the eUICC/iUICC certificate, and an EUM certificate (and possibly other intermediate CA certificates chaining back to the root CA certificate).

AuthenticateClient: The LPApr 200*a* provides the signed data, signature, the eUICC/iUICC certificate, and the EUM certificate (and possibly other intermediate CA certificates) in the AuthenticateClient command to the SM-DP+ 430 that authenticates the client by verifying the certificates and eUICC/iUICC signature (and check that signed server challenge matches sent challenge). Upon successful authentication, the SM-DP+ 430 checks the operation parameter to determine what operation to be performed. In the present case the operation is an RPM operation and the SM-DP+ therefore checks if there is a pending RPM package with RPM operations for the eUICC/iUICC identified by the EID in the eUICC/iUICC certificate. In case an RPM package is available the SM-DP+ signs the RPM package and provides the RPM package and the signature as a response, RPM package server signature.

LoadRPMPackage: The LPApr 200*a* triggers the loading of the RPM package at the eUICC/iUICC. The eUICC/iUICC verifies the SM-DP+ signature using the already available public key (from AuthenticateServer command). Upon successful verification eUICC/iUICC parses the RPM package and executes the contained RPM operation(s). After successful completion (or in case of error at any point) the eUICC/iUICC responds to the LPApr 200*a* with the RPM-PackageResult structure. The RPMPackageResult structure comprises the result of the RPM operation(s) and might further comprise data such as profile information requested from a list profile information RPM operation. The RPM-PackageResult might further comprise data triggering the LPApr 200*a* and/or LPAdv 300*a* to connect to other remote subscription management entities for other remote profile management operations. For example, the LPApr 200*a* might be triggered to connect towards a specific subscription management entity handling update of profile data.

HandleNotification and Notification: The LPApr 200*a* sends the HandleNotification command with the RPMPackageResult structure such that the SM-DP+ 430 can validate the result of the installation and notify the MNO 420.

For certain remote profile management operations consent from the device owner/user 410 might be required before the remote profile management operations are executed. This consent is checked by the LPApr 200*a*.

For some remote profile management operations such as update of profile data the updated profile data should be encrypted to prevent any intermediate nodes to retrieve the information. In this case the message flow will be similar to the profile download flow of FIG. 8 with regards to authenticating and setting up shared session keys for handling the encryption.

Aspects relating to security when splitting the LPAd into LPApr 200*a* and LPAdv 300*a* will now be disclosed.

In some aspects, security for the LPA is related to protecting the communications device 300 from attacks striving to make the communications device 300 unable to communicate by disabling or deleting the profile, protecting the communications device 300 from denial of service attacks against provisioning infrastructure (SM-DP+ 430/SM-DS 440), and/or protecting the communications device 300 from leakage of privacy sensitive data for tracking purposes.

With the split of the LPA functionality as described herein here these aspects apply to both the LPApr 200*a* and LPAdv 300*a*. Compliance and/or certification may be required for both LPApr 200*a* and LPAdv 300*a*. As part of LPAdv 300*a* compliance and/or certification it might be ensured that access control and secure communication mechanisms is in place such that only proxy device 200*s* that can present credentials (such as certificates, RPKs, PSKs) matching those installed in the communications device 300 will be granted access to the LPAdv 300*a* functionality/interface. Hence, a management server can configure its communications device 300*s* to accept to use a particular proxy device 200 for the provisioning, but any other proxy device 200*s* will not be accepted by the communications device 300. As mentioned above a management server can also configure itself to handle the provisioning.

Aspects relating to ensuring connectivity with split LPAd will now be disclosed.

In some aspects the communications device 300 should be protected against attacks striving to make the communications device 300 unable to communicate. In general terms, a large number of communications devices 300 might be located at remote locations or in hard to reach places making it costly to physically handle them. These communications devices 300 generally rely on connectivity always being available and remote update of the communications device 300. To prevent malwares on the communications devices 300, in the operation system as well as for applications running on the communications devices 300, from triggering eUICC/iUICC functions for deleting and disabling profiles the eUICC/iUICC interface might only be reachable from computer code isolated from the operating system and applications. Examples of such computer code are software in the modem of the communications device 300 and trusted applications running in a Trusted Execution Environment (TEE). Hence, at least part of the LPAdv 300a might runs in isolation from the operation system and applications.

The device management protocol and associated secure communication (e.g. LwM2M stack with DTLS) typically terminates in the operating system. Hence, malwares residing in the operating system or applications could alter or trigger commands to the LPAdv 300a to disable or delete a particular profile. To prevent this, messages from the LPApr 200a, at least those for disabling and deleting a profile, could be signed by the LPApr 200a and verified by the LPAdv 300a before sending the corresponding commands to the eUICC/iUICC. For example, an LPApr asymmetric key pair may be used where the LPApr public key, or certificate containing the public key, is securely provisioned into the device during the manufacturing or commissioning phase. A counter (e.g. 32 bits) that is increased for each protected message may be used to prevent replay attacks. The counter from the latest successfully verified message is then kept in the communications device 300.

Another way to ensure that the profile always is valid is to ensure that the provisioning profile, if such a profile was used for initial connectivity, is never deleted and is always enabled if all other profiles are disabled/deleted such that a new profile can be downloaded. This can be solved using so called profile policy rules (PPRs). If a provisioning profile is used it might be available for a factory reset.

Aspects relating to protection against denial of service attacks will now be disclosed.

Since there might not be any client authentication when setting up the HTTPS connection with the SM-DP+ 430/SM-DS 440 there is then a way for any server (without access to a legitimate eUICC/iUICC) to put some workload on a SM-DP+ 430 (or SM-DS 440). It is not until the SM-DP+ 430 (or SM-DS 440) evaluates the AuthenticateClient command that it can reject to the communication. In case a server has authenticated a legitimate eUICC/iUICC, such that all verifications of the AuthenticateClient command are successful, the SM-DP+ 430 (or SM-DS 440) can at this point obtain the EID from the eUICC/iUICC certificate and conclude that there is no profile download prepared or no event available for this particular eUICC/iUICC. In order to create a Denial of Service (DoS) attack that goes further the attacker must be able to trigger profile preparation such that the SM-DP+ 430 is prepared for downloading of profiles for a large number of eUICCs/iUICCs. It might be assumed that MNO 420s have protection against this. With the split of LPAd, protecting from DoS attacks against provisioning infrastructure (SM-DP+ 430/SM-DS 440) primarily relies on the protection of the LPApr 200a in the proxy device 200 standard protection techniques for protection of servers might be assumed to provide adequate protection in this respect.

If malwares exist for the communications device 300 (in the operation system and/or applications) that can trigger communication with non-authorized servers (i.e., not authorized by the device manager) then an attacker may contact MNO 420, trigger profile preparation, and provision a profile into a particular communications device 300. However, since enabling a particular profile means that the currently active profile first must be deleted or disabled, the above described protection will prevent change of the profile. To prevent an attacker to trigger profile download of an already agreed and prepared profile at the SM-DP+ 430 a confirmation code might be presented. Since the confirmation code is only known to the legitimate proxy device 200 (via the device owner) only this proxy device 200 can trigger profile download to the communications device 300.

Aspects relating to reducing the protocol data transmitted between the proxy device 200 and the communications device 300 will now be disclosed.

For constrained battery-operated devices, communication is generally considered very costly compared to computing. Hence, any adaptation that can be carried out resulting in fewer bits being sent between the proxy device 200 and the communications device 300 will extend battery life-time.

Most message sizes of the messages sent between the proxy device 200 and the communications device 300 in FIG. 7 are small except for AuthenticateServerRequest, AuthenticateServerResponse, and PrepareDownloadRequest. One reason these messages are comparatively large is because they include certificates. The server certificates (and possibly intermediate CA certificates chaining back to the root CA) in the AuthenticateServerRequest and the PrepareDownloadRequest depend on the SM-DP+ 430 and cannot be preconfigured in the communications device 300 (assuming the communications device 300 shall be flexible and be able to connect to several different SM-DP+ 430 servers). But the iUICC certificate and EUM certificate (and possibly other intermediate CA certificates chaining back to the root CA) that is part of AuthenticateServerResponse are the same for all profile downloads independently of the SM-DP+ 430 server. These certificates can be made available to the LPApr 200a. It is then possible for the communications device 300 to not send these certificates as part of the AuthenticateServerResponse message and instead have LPApr 200a to include them in the AuthenticateClient command sent to SM-DP+ 430. In this example the message size is then reduced by 1154 bytes.

Even among the other data sent by the device compression of the messages is possible. The response messages AuthenticateServerResponse, PrepareDownloadResponse, and ProfileInstallationResult contain data that is either constant eUICC/iUICC data or data that is part of the request messages and is signed by the eUICC/iUICC for authentication purpose. It is possible to reduce even further the size of the messages sent from the communications device 300 to the LPApr 200a and have the LPApr 200a reconstruct the Distinguished Encoding Rules (DER) encoded messages before sending them to the SM-DP+ 430. For example, the AuthenticateServerResponse may be as small as 65 bytes, the PrepareDownloadMessage may be as small as 129 bytes, and the ProfileInstallationResult upon successful profile installation may be as small as 77 bytes.

Further compression of messages is possible also for messages sent from the proxy device 200 to the communications device 300. For example, the transaction ID in PrepareDownloadRequest and in the BPP (part of initialiseSecureChannelRequest) may be left out as it should be the same as in AuthenticateServerRequest and the communications device 300 will the use its cached transaction ID value when reconstructing the messages before verification of them. This saves maximum 18 bytes of each message.

Aspects of compression of messages will now be disclosed.

As disclosed above, response messages AuthenticateServerResponse, PrepareDownloadResponse, and ProfileInstallationResult may be compressed when sent from the communications device 300 to the proxy device 200 and then restored by the proxy device 200 before forwarding them to the SM-DP+ 430. Data that the communications device 300 may skip to send is either constant eUICC/iUICC data that is known to LPApr 200*a* or data that the LPApr 200*a* may extract from the request messages.

The AuthenticateServerResponse message/structure upon successful authentication of the server (SM-DP+) consists of the transaction ID, the server address, the server challenge and device information, which are all part of AuthenticateServerRequest, and the eUICC/iUICC information, the eUICC/iUICC certificate, and the EUM certificate (and possibly other intermediate CA certificates) are constants independent of the SM-DP+ that could be stored in LPApr 200*a*. Hence, it is enough to send the eUICC/iUICC signature (64 bytes in the present example) and an additional byte to indicate successful response. The LPApr 200*a* can then reconstruct the full response (1400 bytes in the present example). In case of error response it is enough to send one byte indicating error response and an additional byte with the error code. Examples of transaction ID, server address, server challenge, device information, eUICC/iUICC information, eUICC/iUICC certificate, EUM certificate, and eUICC/iUICC signature, when using ASN.1 notation of AuthenticateServerResponse message/structure, are transactionId, serverAddress, serverChallenge, ctxParams1, eUICCInfo2, euiccCertificate, eumCertificate, and euiccSignature1, respectively.

The PrepareDownloadResponse upon successful download preparation contains the transaction ID and the hash of the confirmation code (optional) that are both also part of PrepareDownloadRequest. Hence, it is enough to send the eUICC/iUICC one-time public key (65 bytes in the present example, where the first byte is fixed and could be omitted), the eUICC/iUICC signature (64 bytes in the present example), and an additional byte to indicate successful response. The LPApr 200*a* can then reconstruct the full response (183 bytes in the present example). In case of error response it is enough to send one byte indicating error response and an additional byte with the error code. Examples of transaction ID, hash of the confirmation code, eUICC/iUICC one-time public key, and eUICC/iUICC signature, when using ASN.1 notation of PrepareDownloadResponse message/structure, are transactionId, hashCc, euiccOtpk, and euiccSignature2, respectively.

In case of ProfileInstallationResult indicating successful installation it is enough to send the following bytes (77 bytes in the present example) to the LPApr 200*a* that then can reconstruct the full ProfileInstallationResult structure: one byte specifying success result, one byte specifying sequence number, 10 bytes for the ICCID, one byte for the Issuer Security Domain Profile Application Identifier (ISD-P AID); the ISD-P AID is 16 bytes long, but could be selected as a 15-byte constant known to LPApr 200*a*, and one byte selected by the iUICC/eUICC for distinguishing different profiles on the iUICC/eUICC, and 64 bytes for the eUICC/iUICC signature. Other data such as transaction ID, profile management operation information, notification address, and object identifier of the SM-DP+ is information that is known to the LPApr 200*a* or can be obtained from other messages by the LPApr 200*a*. Examples of sequence number, ICCID, ISD-P AID, eUICC/iUICC signature, transaction ID, profile management operation information, notification address, and object identifier of the SM-DP+, when using ASN.1 notation of ProfileInstallationResult message/structure, are seqNumber, iccid, aid, euiccSignPIR, transactionId, profileManagementOperation, notificationAddress, and smdpOid, respectively.

In order to allow for additional checks that a particular eUICC/iUICC is associated with a given communications device 300 the GSMA RSP consumer variant mandates the eUICC/iUICC to sign a structure provided by the LPAd 300*a* containing device information. This structure is part of the AuthenticateServerRequest message/structure and an example of this structure using ASN.1 notation is ctxParams1. The structure is signed as part of the mutual authentication between the eUICC/iUICC and the SM-DP+ 430. The SM-DP+ 430 may perform such additional checks based upon information from the MNO 420.

It is possible to enhance the GSMA RSP protocol to allow SM-DP+ 430 to perform additional checks, upon request from the MNO 420, to make sure a compliant and certified proxy device 200 is being used for the LPApr operations.

One alternative is to use client authenticated HTTPS for protection of the ES9+ interface instead of only server authenticated HTTPS. In this way the SM-DP+ 430 can authenticate the proxy device 200. For example, a trusted party may issue a certificate, CERTpr, to the proxy device 200 as part of compliance and/or certification that allows the proxy device 200 to act as LPApr 200*a* for the communications device 300. CERTpr is associated with a private key of the proxy device 200. The trusted party may be GSMA and the certificate may be issued by the GSMA Certificate Issuer (CI) 450). It may also be another entity trusted by the MNO 420 from where a profile is requested and the information about this entity is transferred from the MNO 420 to the SM-DP+ 430 as part of the information when setting up a profile download. The entity may also be the MNO 420 itself allowing a particular proxy device 200 to be used for a particular profile download.

Another alternative, if ephemeral ECDH TLS server authenticated HTTPS is used, is that the proxy device 200 might sign its ephemeral EC public key and the ephemeral EC public key obtained from the SM-DP+ 430 using the private key associated with CERTpr. This signature is then sent to the communications device 300, as part of the device information (ctxParams1). The device information is signed by the eUICC/iUICC as part of mutual authentication between the SM-DP+ 430 and the eUICC/iUICC. By including the signature of the proxy device 200, the proxy device 200 can be authenticated by the SM-DP+ 430. CERTpr is used by the SM-DP+ 430 to verify the signature with the ephemeral EC public keys from the HTTPS connection establishment. Upon successful verification the proxy device 200 is authenticated and the SM-DP+ 430 can establish that a legitimate proxy device 200 is used. In this way there is no need for change in the HTTPS setup (and thus still server authentication HTTPS is used) but changes to the device information (ctxParams1) structure is needed. CERTpr might be delivered to the SM-DP+ 430 as part of the device information or via the MNO 420 as part of profile download setup. Alternatively, to save space, the hash of CERTpr, the public key of the proxy device 200, or hash of the public key of the proxy device 200 may be included in the device information. The SM-DP+ 430 might from this information locate the certificate/public key.

The communications device 300 might check CERTpr (or equivalent information according to the above) against a whitelist of approved proxy device 200*s* to determine if the proxy device 200 should be trusted. This is meaningful only if the LPApr 200*a* is not implemented as part of the MS which is also managing the whitelist within the communications device 300. CERTpr (or CERTpr in the form of an RPK only) may also be used for protecting the communication between the proxy device 200 and the communications device 300 and is retrieved by the communications device 300 as part of establishing the secure communication. CERTpr may include EID ranges for which the MS is allowed to act as LPApr 200a. The EID ranges can be validated at the communications device 300 and/or the SM-DP+ 430.

In summary, according to at least some of the herein disclosed embodiments, GSMA RSP consumer profile might be used for provisioning of 3GPP profiles to a communications device 300, such as a constrained device, equipped with either an eUICC or an iUICC. The communications between the provisioning to server SM-DP+ 430 and the communications device 300 goes via a proxy device 200 and the functionality of the LPAd is split between the proxy device 200 and the communications device 300. A HTTPS connection with the SM-DP+ 430 is terminated in the LPAd part in the proxy device 200, where a suitable application layer protocol and secure communication mechanism supported by the communications device 300 is used to enable secure communications between the two LPAd parts (in proxy device 200 and the communications device 300, respectively). This to prevent unauthorized access to local profile management functions in the communications device 300. The LPAd part in the proxy device 200 might comprise a profile management operation interface for the user 410 to be able to communicate with the communications device 300. Compression of messages between the two LPAd parts allows the number of bits transmitted by, and received by, the communications device 300 to be reduced, or even minimized, at least so as to be much smaller compared to the default consumer variant protocol. In some embodiments the secure communication between the two LPAd parts is using the same protocol suite (and is using the same keys) as for securing other operations between the communications device 300 and the proxy device 200. For example, such operations may be related to management of the communications device 300. The functionality of the proxy device 200 might be implemented in the Management Server managing the communications device 300. The secure management protocol might be used to secure the communication between the two LPAd parts. The protocol stack used may be the LwM2M protocol stack (including CoAP, DTLS, and User Datagram Protocol (UDP)).

If the proxy device 200 is co-located with another entity that the communications device 300 uses and a protocol suite is used for secure communications between the communications device and this entity then this protocol suit could be re-used. Such a suite could be for device management (e.g. LwM2M) or data management/delivery. If the proxy device 200 is not co-located then a protocol suite could be selected that the communications device 300 is already using for communication with another to entity. That is, if the proxy device 200 is implemented/configured in the management server, then the same protocol suite as used for secure device management between the management server and the communications device 300 could be used. Otherwise the same protocol suite as used for communication with other entities, such as for device management or data management/delivery, could be used.

Figure 9:
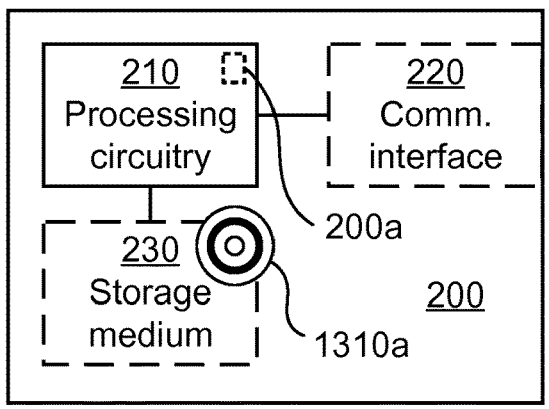
FIG. 9 is a schematic diagram showing functional units of a proxy device according to an embodiment.

FIG. 9 schematically illustrates, in terms of a number of functional units, the components of a proxy device 200 according to an embodiment. Processing circuitry 210 is provided using any combination of one or more of a suitable CPU, multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the proxy device 200 to perform a set of operations, or steps, S102-S124 and those in FIG. 7, as disclosed above. For example, the storage medium 230 may store the set of operations, and the processing circuitry 210 may be configured to retrieve the set of operations from the storage medium 230 to cause the proxy device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The proxy device 200 may further comprise a communications interface 220 for communications with other entities, devices, functions, and nodes. As such the communications interface 220 may comprise one or more transmitters and receivers, comprising analogue and digital components.

The processing circuitry 210 controls the general operation of the proxy device 200 e.g. by sending data and control signals to the communications interface 220 and the storage medium 230, by receiving data and reports from the communications interface 220, and by retrieving data and instructions from the storage medium 230. Particularly, the processing circuitry 210 might implement the functionality of the LPApr 200a.

Other components, as well as the related functionality, of the proxy device 200 are omitted in order not to obscure the concepts presented herein.

Figure 10:
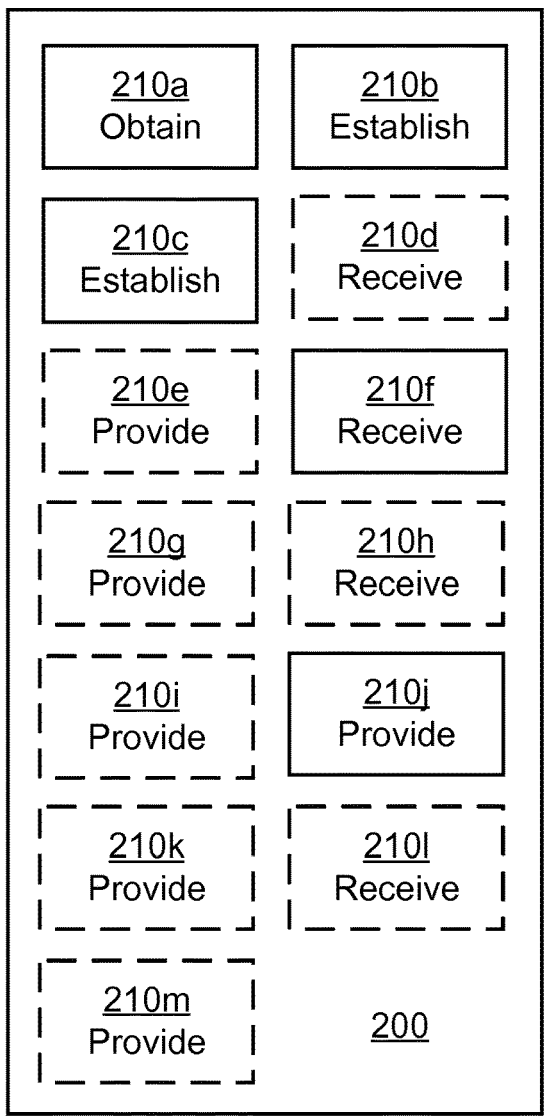
FIG. 10 is a schematic diagram showing functional modules of a proxy device according to an embodiment.

FIG. 10 schematically illustrates, in terms of a number of functional modules, the components of a proxy device 200 according to an embodiment. The proxy device 200 of FIG. 10 comprises a number of functional modules; an obtain module 210a configured to perform step S102, a first establish module 210b configured to perform step S104, a second establish module 210c configured to perform step S106, a receive module 210f configured to perform step S112, and a provide module 210j configured to perform step S120. The proxy device 200 of FIG. 10 may further comprise a number of optional functional modules, such as any of a receive module 210d configured to perform step S108, a provide module 210e configured to perform step S110, a provide module 210g configured to perform step S114, a receive module 210h configured to perform step S116, a provide module 210i configured to perform step S118, a provide module 210k configured to perform step S120a, a receive module 210l configured to perform step S122, a provide module 210m configured to perform step S124.

In general terms, each functional module 210a-210m may be implemented in hardware or in software. Preferably, one or more or all functional modules 210a-210m may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210m and to execute these instructions, thereby performing any steps of the proxy device 200 as disclosed herein.

There could be different examples of proxy devices 200 and different ways to implement the proxy device 200. According to an embodiment, the proxy device 200 is a part of a management server.

Figure 11:
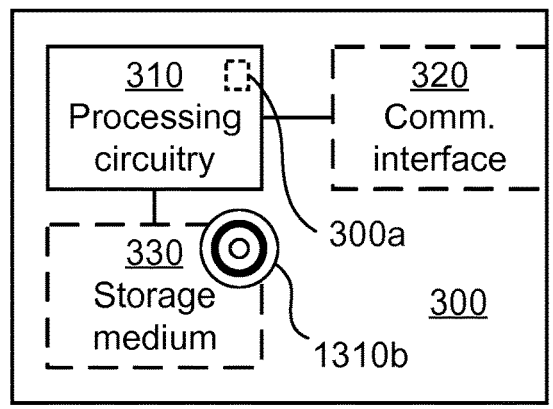
FIG. 11 is a schematic diagram showing functional units of a communications device according to an embodiment.

FIG. 11 schematically illustrates, in terms of a number of functional units, the components of a communications device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the communications device 300 to perform a set of operations, or steps, S202-S212 and those in FIG. 7, as disclosed above. For example, the storage medium 330 may store the set of operations, and the processing circuitry 310 may be configured to retrieve the set of operations from the storage medium 330 to cause the communications device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The communications device 300 may further comprise a communications interface 320 for communications with other entities, devices, functions, and nodes. As such the communications interface 320 may comprise one or more transmitters and receivers, comprising analogue and digital components.

The processing circuitry 310 controls the general operation of the communications device 300 e.g. by sending data and control signals to the communications interface 320 and the storage medium 330, by receiving data and reports from the communications interface 320, and by retrieving data and instructions from the storage medium 330. Particularly, the processing circuitry 310 might implement the functionality of the LPAdv 300a.

Other components, as well as the related functionality, of the communications device 300 are omitted in order not to obscure the concepts presented herein.

Figure 12:
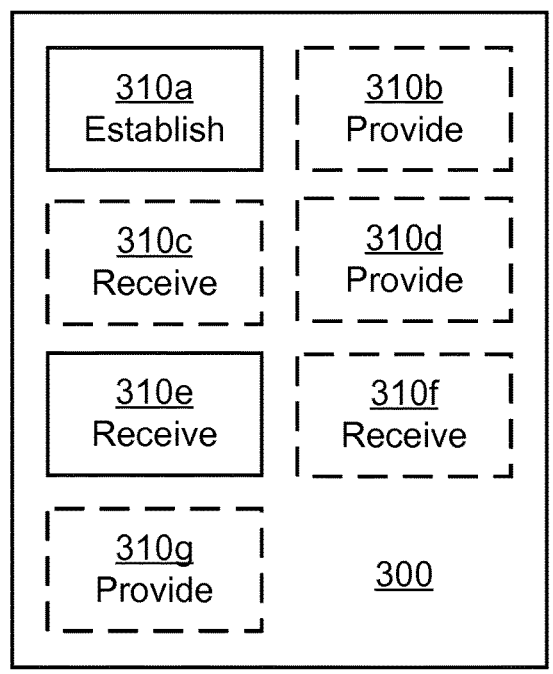
FIG. 12 is a schematic diagram showing functional modules of a communications device according to an embodiment.

FIG. 12 schematically illustrates, in terms of a number of functional modules, the components of a communications device 300 according to an embodiment. The communications device 300 of FIG. 12 comprises a number of functional modules; an establish module 310a configured to perform step S202, and a receive module 310e configured to perform step S210. The communications device 300 of FIG. 12 may further comprise a number of optional functional modules, such as any of a provide module 310b configured to perform step S204, a receive module 310c configured to perform step S206, a provide module 310d configured to perform step S208, a receive module 310f configured to perform step S210a, a provide module 310g configured to perform step S212.

In general terms, each functional module 310a-310g may be implemented in hardware or in software. Preferably, one or more or all functional modules 310a-310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310g and to execute these instructions, thereby performing any steps of the communications device 300 as disclosed herein.

There could be different examples of communications devices 300 and different ways to implement the communications device 300. According to an embodiment, the communications device 300 is a constrained device, such as an IoT device.

Figure 1:
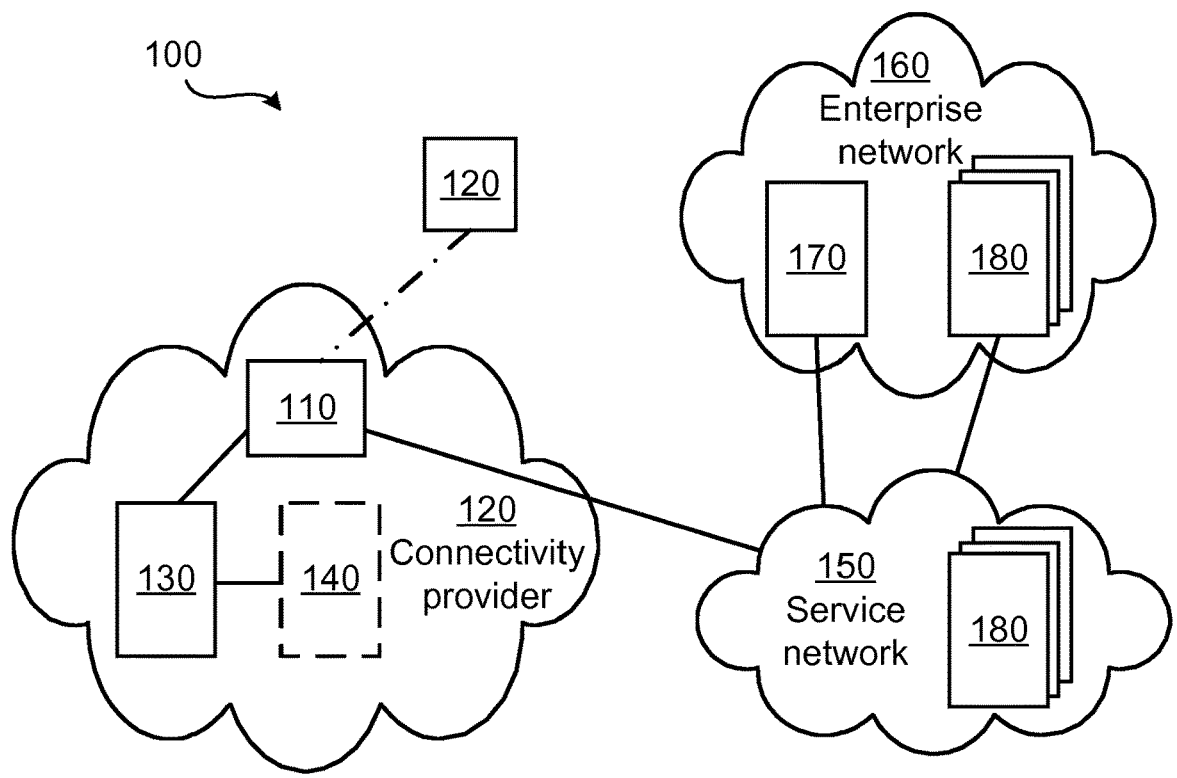
FIG. 1 is a schematic diagram illustrating a communication network according to embodiments.
Figure 13:
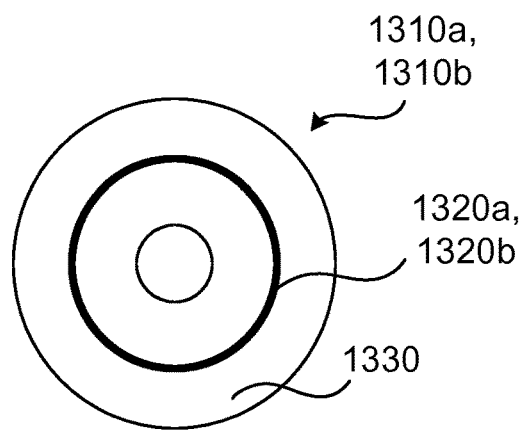
FIG. 13 shows one example of a computer program product comprising computer readable means according to an embodiment.

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the proxy device 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the communications device 300 as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended list of claims.

The invention claimed is:

1. A method for profile handling of a communications device, the method being performed by a local profile assistant of a proxy device, the method comprising:
  obtaining an indication of handling a profile of the communications device;
  establishing a first secure communications link with a local profile assistant of the communications device;
  establishing a second secure communications link with a subscription management entity of the communications device;
  receiving information pertaining to handling of the profile by the local profile assistant of the communications device, the information being received from the subscription management entity over the second secure communications link;

providing the information to the local profile assistant of the communications device over the first secure communications link;
providing a PrepareDownloadRequest message to the communications device, wherein the PrepareDownloadRequest message comprises data for preparing profile download to the communications device but lacks transaction ID; and
providing an InstallBPP message to the communications device, wherein the InstallBPP message comprises the profile but lacks transaction ID.

2. The method according to claim 1, further comprising:
receiving an AuthenticateServerResponse message from the communications device pertaining to authentication of the subscription management entity at the communications device, wherein the AuthenticateServerResponse message lacks iUICC certificate or eUICC certificate, EUM certificate, eUICC/iUICC information, transaction ID, server address, server challenge, and device information;
providing an AuthenticateClient message to the subscription management entity pertaining to authentication of the communications device at the subscription management entity, wherein the AuthenticateClient message comprises the iUICC certificate, the EUM certificate, eUICC/iUICC information, transaction ID, server address, server challenge, and device information.

3. The method according to claim 1, further comprising:
receiving a PrepareDownloadResponse message from the communications device pertaining to successful preparation of download of the profile to the communications device, wherein the PrepareDownloadResponse message lacks transaction ID and hash of a confirmation code; and
providing a GetBoundProfilePackage message to the subscription management entity pertaining to retrieving a Bound Profile Package from the subscription management entity, wherein the GetBoundProfilePackage message comprises the transaction ID and the hash of the confirmation code.

4. The method according to claim 1, further comprising:
receiving a first status message from the communications device over the first secure communications link relating to status of the information provided to the local profile assistant of the communications device; and
providing a second status message to the subscription management entity over the second secure communications link in response thereto, wherein content of the second status message being based on the status of the information provided to the local profile assistant of the communications device.

5. The method according to claim 4, wherein the first status message is a ProfileInstallationResult message, wherein the ProfileInstallationResult message lacks transaction ID, profile management operation information, notification address, and object identifier of the subscription management entity, and wherein the second status message is a HandleNotification message, wherein the HandleNotification message comprises the transaction ID, profile management operation information, notification address, and object identifier of the subscription management entity.

6. The method according to claim 1, wherein establishing the second secure communications link comprises providing a certificate from the proxy device to the subscription management entity.

7. The method according to claim 1, wherein establishing the second secure communications link comprises digitally signing an ephemeral elliptic curve public key to obtain a signature, and providing a signature from the proxy device to the communications device.

8. A proxy device for profile handling of a communications device, the proxy device comprising processing circuitry, the processing circuitry being configured to cause a local profile assistant of the proxy device to:
obtain an indication of handling a profile of the communications device;
establish a first secure communications link with a local profile assistant of the communications device;
establish a second secure communications link with a subscription management entity of the communications device;
receive information pertaining to handling of the profile by the local profile assistant of the communications device, the information being received from the subscription management entity over the second secure communications link;
provide the information to the local profile assistant of the communications device over the first secure communications link;
providing a PrepareDownloadRequest message to the communications device, wherein the PrepareDownloadRequest message comprises data for preparing profile download to the communications device but lacks transaction ID; and
provide an InstallBPP message to the communications device, wherein the InstallBPP message comprises the profile but lacks transaction ID.

\* \* \* \* \*